United States Patent
Leu

(10) Patent No.: US 10,046,235 B2
(45) Date of Patent: Aug. 14, 2018

(54) ENHANCED PEER-TO-PEER NETWORKING EXCHANGE

(71) Applicant: PAYPAL, INC., San Jose, CA (US)

(72) Inventor: Aaron Ta-Tsung Leu, Austin, TX (US)

(73) Assignee: PayPal, Inc., San Jose, CA (US)

( * ) Notice: Subject to any disclaimer, the term of this patent is extended or adjusted under 35 U.S.C. 154(b) by 40 days.

(21) Appl. No.: 14/971,190

(22) Filed: Dec. 16, 2015

(65) Prior Publication Data
US 2017/0173460 A1   Jun. 22, 2017

(51) Int. Cl.

| | |
|---|---|
| *G06F 3/048* | (2013.01) |
| *A63F 13/34* | (2014.01) |
| *H04L 29/08* | (2006.01) |
| *H04W 4/02* | (2018.01) |
| *H04W 4/00* | (2018.01) |
| *H04B 5/00* | (2006.01) |
| *G06Q 20/22* | (2012.01) |
| *G06Q 20/32* | (2012.01) |
| *G06Q 50/12* | (2012.01) |
| *G06F 3/0488* | (2013.01) |
| *H04W 4/80* | (2018.01) |
| *G06F 1/16* | (2006.01) |
| *H04W 84/12* | (2009.01) |

(52) U.S. Cl.
CPC .......... *A63F 13/34* (2014.09); *G06F 1/1698* (2013.01); *G06F 3/04883* (2013.01); *G06Q 20/223* (2013.01); *G06Q 20/3278* (2013.01); *G06Q 50/12* (2013.01); *H04B 5/0031* (2013.01); *H04L 67/104* (2013.01); *H04W 4/008* (2013.01); *H04W 4/02* (2013.01); *H04W 4/80* (2018.02); *H04W 84/12* (2013.01)

(58) Field of Classification Search
CPC ...................................... G06F 3/048
See application file for complete search history.

(56) References Cited

U.S. PATENT DOCUMENTS

2012/0078788 A1* 3/2012 Gandhi ............... G06Q 20/40
                                                                 705/44
2014/0279531 A1* 9/2014 Levkovitz .......... G06Q 20/223
                                                                 705/44

* cited by examiner

*Primary Examiner* — Peiyong Weng
(74) *Attorney, Agent, or Firm* — Haynes & Boone, LLP

(57) ABSTRACT

Systems, methods, and computer program products are disclosed for improving ease in transmitting information between peer devices. Communications devices establish a peer group. Each communications device in the group assigns different sections of its touchscreen to the other devices in the group. To transfer information to another device in the group, the user swipes on the touchscreen towards the assigned section for the target communications device. Upon detecting the swipe, and determining that the swipe was towards the assigned section, the communications device initiates a transfer of the information to the target communications device. This may involve confirmation at the device or a paired device before transfer, or no confirmation. Receipt of the information at the target communications device may trigger notifications to be displayed. It may also trigger a request for acceptance of the transfer at the target communications device after which receipt is confirmed.

20 Claims, 8 Drawing Sheets

ENHANCED PEER-TO-PEER NETWORKING EXCHANGE

TECHNICAL FIELD

The present disclosure generally relates to communications between communications devices, and more particularly to the contemporaneous transfer of different types of information to other communications devices based on one or more user gestures or actions.

BACKGROUND

Transferring information between devices typically involves entering an address for the targeted recipient, e.g., an address that some device associated with the target recipient is able to access, followed by requesting that the information be transferred. This may be true even if the target recipient, and a capable device, is within some small distance from the initiating device (e.g., a predetermined number of feet from each other). This lacks the convenience made available from peer-to-peer communication technologies.

Devices that implement peer-to-peer technologies also are subject to drawbacks. Even when a peer connection is established, the user of the initiating device must still typically identify by some form of address the target recipient. In other situations, the devices are only configured to enable the transfer of information when just two devices are connected together via a network connection. This precludes situations, however, where there are multiple devices within an area that desire to share information with the other devices. Thus, there is a need for techniques to improve the ability for multiple networked devices to transfer information amongst each other with greater ease.

Figure 1:
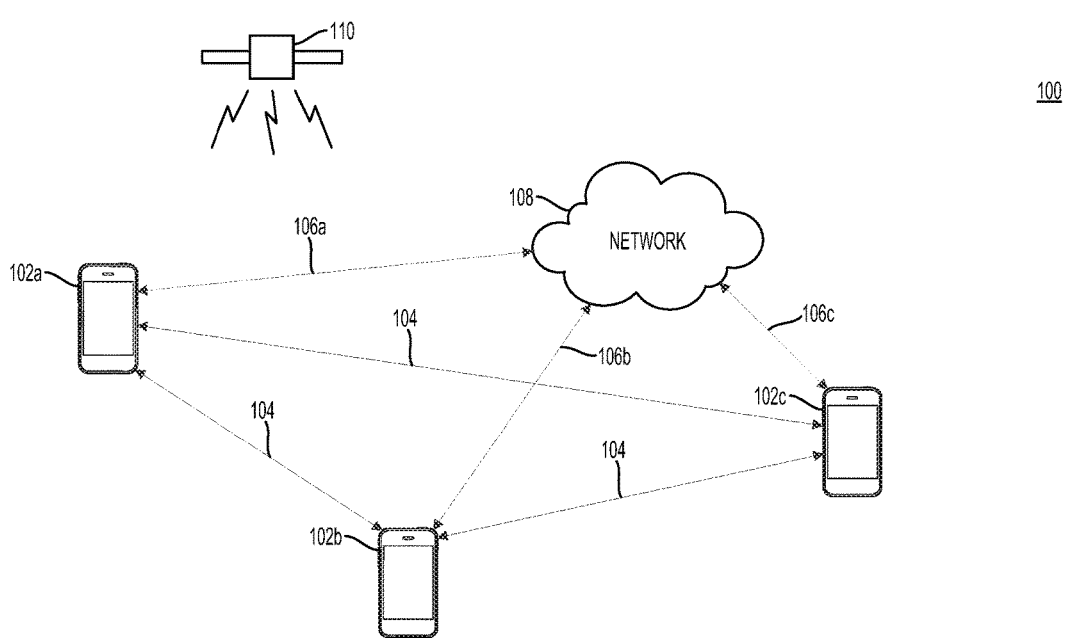
FIG. 1 is a diagram of an exemplary communications environment according to embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The present disclosure provides systems, methods, and computer program products for improving the ease with which information is transmitted between peer devices. According to embodiments of the present disclosure, multiple communications devices establish a peer group amongst themselves, whether via direct communications or via an intermediary such as a network. Each communications device in the peer group assigns different sections of its touchscreen to the other different devices in the peer group.

When the user of a communications device desires to transfer information (such as a monetary amount, an image, text, other data, etc.) to another of the communications devices in the peer group, the user swipes on the touchscreen towards the assigned section of the touchscreen assigned to the particular communications device. Upon detecting the swipe, and determining that the swipe was towards the assigned section, the communications device initiates a transfer of the information (e.g., information entered into or arrived at on the touchscreen or determined from the swipe itself, such as a number of fingers involved in the swipe) to the target communications device. In some embodiments, this may involve confirmation at the communications device or a paired device (e.g., a smartwatch) before transfer, while in other embodiments, the transfer may occur without further interruption.

Receipt of the transferred information at the target communications device may trigger one or more notifications to be displayed at the target communications device. It may also trigger the target communications device to request acceptance of the transfer at the target communications device before the transfer can be complete. The target communications device may then confirm receipt (or decline receipt) of the information to the sending communications device.

Referring now to FIG. 1, an embodiment of an exemplary communications environment 100 is illustrated. The communications environment 100 may include a number of mobile communications devices 102, one or more networks 108, and a global navigation satellite system (GNSS) 110. The communications environment 100 illustrated in FIG. 1 is simplified for sake of illustration.

The communications environment 100 may support operation on multiple carriers (e.g., waveform signals of different frequencies for wireless communications, or wired communications). As an example, the communications environment 100 may be a multi-carrier LTE network capable of efficiently allocating network resources. The communications environment 100 is one example of a network to which various aspects of the disclosure apply.

The communications environment 100 includes one or more mobile communications devices 102, illustrated in FIG. 1 as mobile communications devices 102a, 102b, and 102c. The mobile communications devices 102a/102b/102c may be, for example, User Equipment (UEs). The mobile communications devices 102a/102b/102c may each also be referred to as a terminal, a mobile station, a subscriber unit, etc. A mobile communications device 102 may be a cellular phone, a smartphone, a personal digital assistant, a wireless modem, a laptop computer, a tablet computer, a tag (e.g., RFID tag), etc., to name just a few examples. The mobile communications devices 102a/102b/102c may be location-aware, for example by including circuitry and/or software to enable the mobile communications devices 102a/102b/102c to determine their own locations.

For example, one or more of the mobile communications devices 102a/102b/102c may include circuitry and/or software that enable them to be in communication with the GNSS 110 in order to determine location. The GNSS 110 may be, for example, the Global Positioning System (GPS), Galileo, GLONASS, BeiDou, or some other such system that enables the mobile communications devices 102a/102b/102c to determine geolocation information from signals provided by individual satellites of the GNSS 110. The circuitry and/or software of mobile communications devices 102a/102b/102c may additionally or alternatively enable location determination based on other parameters, such as base station triangulation, time of flight measurements, etc.

The mobile communications devices 102a/102b/102c may communicate with each other (as well as other devices) via one or more connections. For example, the mobile communications device 102a may be capable of establishing a peer-to-peer (P2P) session 104 with one or both of the mobile communications devices 102b and 102c. Similarly, the mobile communications device 102b may be capable of establishing a peer-to-peer session 104 with one or both of the mobile communications devices 102a and 102c. Similarly, the mobile communications device 102c may be capable of establishing a peer-to-peer session 104 with one or both of the mobile communications devices 102a and 102b.

For example, the mobile communications devices 102a/102b/102c may be capable of (e.g., includes one or more associated transceivers for) linking to each other via device-to-device (D2D) links, such that the P2P sessions 104 may constitute D2D links. As another example, the mobile communications devices 102a/102b/102c may be capable of (e.g., includes one or more associated transceivers for) connecting via Bluetooth or near field communications (NFC) with each other, to name just a few examples. The mobile communications devices 102a/102b/102c may all establish the same types of P2P sessions 104 with each other (e.g., all using the same linking technology/protocols), or alternatively may use a variety of technologies/protocols in order to establish the P2P sessions 104 in the communications environment 100.

Alternatively, one or more of the mobile communications devices 102a/102b/102c may establish connections to each other via the network 108. For example, the mobile communications device 102a may establish the connection 106a with the network 108, the mobile communications devices 102b may establish the connection 106b with the network 108, and the mobile communications device 102c may establish the connection 106c with the network 108. For example, the mobile communications device 102a may communicate with mobile communications device 102b, via the network 108, by way of the connections 106a and 106b (e.g., the connection 106a constitutes an uplink to the network 108 and the connection 106b a downlink from the network 108). Similarly, the mobile communications device 102 may communicate with mobile communications device 102c, via the network 108, by way of connections 106a and 106c. Similar examples apply with respect to the other mobile communications devices 102b and 102c.

The network 108 may be, for example, a core network, an access network, other network, and/or any combination of networks. The network 108 may include one or more base stations. For example, one or more the base stations may include an evolved Node B (eNodeB). A base station may also be referred to as a base transceiver station or an access point. There could be one to many base stations, as well as be an assortment of different types such as macro, pico, and/or femto base stations. The base stations may also communicate with one another directly or indirectly, such as via network 108. The network 108 may be an LTE network or a WiFi network, to name just a few examples. The mobile communications devices 102 may use the network 108 to convey the data communications between them according to embodiments of the present disclosure. The mobile communications devices 102 may use one or more elements of the network 108 to discover each other, while in other embodiments the mobile communications devices 102 may discover each other through NFC or Bluetooth ad-hoc connections for initial session negotiation and continue communication via NFC or Bluetooth, or alternatively via network 108.

In another embodiment, an intermediary such as the network 108 may function to initially assist different mobile communications devices 102 to discover each other and/or establish peer-to-peer sessions 104 as illustrated in FIG. 1. For example, the mobile communications device 102a may send a message to the network 108, to which the mobile communications device 102a is connected (e.g., a WiFi network), intended to reach the mobile communications device 102b. The message may include a unique identifier or code that the mobile communications device 102b may use to initiate the peer-to-peer session 104 between the two mobile communications devices.

One of the mobile communications devices 102 may operate as a host to other mobile communications devices 102 in sending and receiving information according to embodiments of the present disclosure. For example, the mobile communications device 102a in FIG. 1 may designate itself as a host of a group (ad-hoc or otherwise), or be designated by another mobile communications device 102 or network 108 element as a host. As host, the mobile communications device 102a may provide a unique PIN/identifier or other code (e.g., a QR code) via email, messaging, image presentation, NFC, or other communication type to one or more other mobile communications devices 102, such as mobile communications device 102b.

As another example, a service provider may serve as host to a group of different mobile communications devices 102 (ad-hoc or otherwise) seeking to exchange information together according to embodiments of the present disclosure. The service provider (e.g., PayPal of San Jose, Calif. to name just one example) may be accessed by one or more mobile communications devices 102 via the network 108, for example. To ensure security, the service provider may, in response to the request to host the ad-hoc group, provide a code for desired group members to enter to join the hosted group. Alternatively, the service provider may check the address information of each mobile communications device 102 desiring to join (e.g., IP address/subnet information, etc.) to confirm that the mobile communications devices 102 are within a pre-determined range of each other (e.g., a certain number of feet or yards/meters from each other, such as a range that would be associated with remaining in visibility of each other). With this information, the different mobile communications devices 102 seeking to join the same group may then join and proceed with exchanging information according to embodiments of the present disclosure (whether via direct P2P protocols or via some intermediary such as network 108).

Once various mobile communications devices 102 are connected in a peer-to-peer group, whether hosted, decentralized (no host), directly connected to each other or via an intermediary such as network 108, the mobile communications devices 102 in the group may assign different sections of their screens to the different mobile communications devices 102 that are members of the group. For example, if the group consists of the mobile communications devices 102a, 102b, and 102c of FIG. 1, each device may assign two sections of their respective display screens to represent targets for the two other mobile communications devices 102 in the group. For example, mobile communications device 102b may assign an upper left corner of its screen to represent the mobile communications device 102a and an upper right corner of its screen to represent the mobile communications device 102c. This may be performed while in a specific application that has integrated embodiments of the present disclosure, or unrelated to any specific application (e.g., while in a "home" screen of a graphical user interface (GUI) of the mobile communications device 102b).

Once sections of the screen are assigned, the mobile communications device 102b is ready to transfer information to one or more of the mobile communications devices 102a/102c in the group. For example, if the user of the mobile communications device 102b desires to transfer money to the mobile communications device 102a, the user may identify an amount of money to be sent and then swipe on the screen (which, in this example, is a touchscreen) in the general direction toward the upper left corner of the screen. This indicates that the identified amount should be transferred to the mobile communications device 102a. In response, a message is sent to the mobile communications device 102a from the mobile communications device 102b via the connection previously established for the group (for example, P2P session 104 or uplink 106b/downlink 106a). This may be accompanied by auditory and/or visual indicators of the identified amount being sent (e.g., a swooshing sound and/or perspective graphic of cash moving toward the designated section of the screen). Money is just one example; other types of information that may be sent include virtual currency amounts, wagers, images, videos, text messages, etc. to name a few examples.

In an embodiment, the transfer between mobile communications device 102b and mobile communications device 102a may occur without further input from the user of the mobile communications device 102b (the originator of the transfer of information). This may occur, for example, where the user of the mobile communications device 102b has previously identified the mobile communications device 102a as a trusted recipient, the mobile communications device 102b has automatically identified the mobile communications device 102a as a trusted recipient based on a previous similar action, or based on the value of the transfer being less than a threshold amount (whether set by default or the user of either the mobile communications device 102b or 102a). For example, the mobile communications device 102b may be allowed to transmit money directly to the designated recipient in response to an appropriate swipe to the appropriate section of the display screen if the amount is less than (or equal to in some embodiments) $10 (as just one example, any other value could be selected or set by default as well).

In an alternative embodiment, the transfer may require confirmation by the user of the mobile communications device 102b before completing the transfer to the intended recipient (in this example, mobile communications device 102a), for example for all transfers or for transfers above a particular value (or, for messages or images, for transfers to "untrusted" recipients, such as those that have not been identified as trusted yet). For example, a confirmation window may be displayed on the screen of the mobile communications device 102b requesting the user to tap a button in the confirmation window to confirm or deny the transmission and/or together with one or both of an auditory notification (e.g., a chime) and a tactile notification such as vibration (the particular combination may be set by the user or by default). The confirmation window (and/or other notification) may be satisfied with a tap on an appropriate button or pre-defined section of the screen. Alternatively, the user may be allowed to shake the mobile communications device 102b to confirm transmission (which may be detected by appropriate hardware at the device such as via accelerometer).

Either way, the information may then be transmitted from the mobile communications device 102b to the mobile communications device 102a (whether via P2P session 104 or uplink 106b/downlink 106a). Receipt of the information triggers a notification at the mobile communications device 102a. This may include a passive notification shown when the screen is locked at the mobile communications device 102a, and/or a light notification, or may be configured to display only when the user of the mobile communications device 102a next logs in beyond the locked screen. The notification may request the user of the mobile communications device 102a to accept or reject the information received from the mobile communications device 102b, here the monetary amount in this example. Alternatively, the mobile communications devices 102 in such a group may be configured to automatically accept information received from each other via the group. Upon acceptance or rejection, the mobile communications device 102a may then transmit a status response to the sender mobile communications device 102b identifying the acceptance or rejection.

Figure 2:
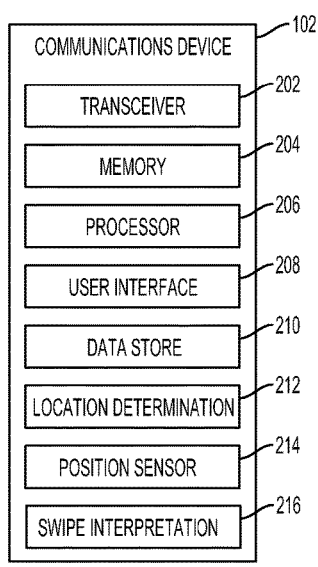
FIG. 2 is a block diagram of an exemplary mobile communications device according to embodiments of the present disclosure.

One exemplary embodiment of the mobile communications devices 102 is depicted in FIG. 2. In FIG. 2, the mobile communication devices 102 include a transceiver 202, a memory 204, a processor 206, a user interface 208, a data store 210, a location determination system 212, a position sensor 214, and a swipe interpretation system 216. These elements may be in direct or indirect communication with each other, for example via one or more buses.

The transceiver 202 may include a modem subsystem and a radio frequency (RF) unit and be configured to communicate bi-directionally with other devices, such as other mobile communications devices 102 and/or the network 108. The memory 204 may include a cache memory (e.g., a cache memory of the processor 206), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium.

The memory 204 may store instructions that, when executed by the processor 206, cause the processor 206 to perform the operations described herein in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor 206 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein and discussed in more detail below. The processor 206 may also be implemented as a combination of computing devices, e.g., a combination of a DSP and a microprocessor, a plurality of microprocessors, one or more microprocessors in conjunction with a DSP core, or any other such configuration. The processor 206 may be a single processor or multiple processors, where each processor may have one or more processing cores capable of parallel and/or sequential operation.

The user interface 208 may include an input component and an output component. For example, the user interface 208 may include a touchscreen interface that outputs data for visual use as well as receives/processes one or more touches/swipes/gestures to be potentially interpreted according to embodiments of the present disclosure such as discussed with respect to swipe interpretation system 216. Further, the user interface 208 may be used to display one or more notifications, elements of information, and application data according to embodiments of the present disclosure. The user interface 208 may also include one or more lights (e.g., LEDs) separate from a touchscreen, a vibration generator, a speaker, a microphone, input for a mouse, input for a keyboard, etc. useful for providing feedback to a user as well as receiving further input therefrom.

The data store 210 may be, for example, a hard drive, flash drive, storage array, or other type of storage. The data store 210 may store notifications, transferred information, location information, map information, and/or update information (e.g., as an "app").

In an embodiment, the location determination system 212 may include one or more transceivers to enable communication with the GNSS 110 illustrated in FIG. 1. The mobile communications devices 102a/102b/102c may further include assisted-GPS for enhanced signal acquisition/location quality.

The position sensor 214 may be an orientation and/or motion detection component, such as a gyroscope and/or accelerometer. It may be used in combination with gesture detection according to embodiments of the present disclosure, such as for confirmation to send information to another device or to accept receipt of information from another device.

The swipe interpretation system 216 may be an example of the app mentioned above with respect to the data store 210. In an embodiment, the swipe interpretation system 216 is an application that communicates with the other components of the mobile communications device 102. For example, the swipe interpretation system 216 assists in prompting a user of the mobile communications device 102 in storing assignments of sections of the touchscreen of the user interface 208 to different entities, such as different mobile communications devices 102 in the same group. This may include prompts to the user on the touchscreen, upon activation of the "app," on how to assign different sections of the touchscreen to different entities while the "app" is being accessed.

The swipe interpretation system 216 also monitors output from the user interface 208, for example identifying a swipe on the user interface 208 where it is a touchscreen. According to embodiments of the present disclosure, various sections of the screen of the user interface 208 may have been previously assigned to different entities that have joined the same group. When the mobile communications device 102 detects a swipe on the touchscreen 208, for example under the control of the processor 206, information about the detected swipe is transferred to the swipe interpretation system 216. This information may include various touch parameters, at least including the location of all (or at least a sufficiently large sampling) touch points on the touchscreen of the swipe (for example as a function of time, so that the first and last touch points are identifiable to assist in finding the direction of the swipe).

With this information, the swipe interpretation system 216 determines the direction in which the detected swipe was directed. This may include determining, from the set of touch points received, a vector of the swipe. As another example, the swipe interpretation system 216 may fit a curve to the set of touch points and determine a direction of the swipe from the fitted curve. Either way, the swipe interpretation system 216 may compare the determined direction of the swipe with the location, on the touchscreen, of the different assigned sections (assigned to the different entities in the group). The swipe interpretation system 216 may estimate a further track of the detected swipe based on the determined direction of the swipe to determine whether it would have intercepted any point of any of the sections of the touchscreen. As another example, the swipe may end over some assigned section, in which case the swipe interpretation system 216 determines that the swipe physically ended on a point of an assigned section of the touchscreen.

In an embodiment, the swipe interpretation system 216 determines that the detected swipe was directed towards an assigned section if the determined direction would intercept some point of an assigned section. In an alternative embodiment, the swipe interpretation system 216 may include a threshold region surrounding the assigned sections on the touchscreen where, if the determined direction intercepts a point in the threshold region but not the assigned section itself, it determines that the detected swipe was directed towards the assigned section. In this case, the swipe interpretation 216 may dynamically adjust the size of this threshold region as a function of the number of assigned sections corresponding to the number of entities (e.g., other mobile communications devices 102) in the group at any given time.

Thus, if there are a small number of entities in the group, and therefore a correspondingly small number of assigned sections on the touchscreen of the user interface 208, the threshold region may be have a moderately large value so that less accurate swipes may still result in a positive identification of a swipe to an assigned section. Further, if there are a relatively large number of entities in the group, and therefore a correspondingly large number of assigned sections, the swipe interpretation system 216 may dynamically decrease the value for the threshold region, sometimes removing it completely when there are many entities in the group, so that positive identifications are reduced to situations that are closer to, actually do, intercept a point in an assigned section.

To avoid misinterpreting the meaning or intent of a swipe on the touchscreen of the user interface 208, the swipe interpretation system 216 may ignore swipes while the "app" is not activated by the user and/or running in the background. Thus, the system may wait until the user activates the swipe interpretation functionality in a multi-peer setting to implement embodiments of the present disclosure.

When the swipe interpretation system 216 determines that a swipe was directed toward an assigned section of the touchscreen of the user interface 208, it directs the transceiver 202 to initiate transmission of information relevant to the purpose of the "app"—for example, a monetary amount, a message, an image, a wager, etc. In embodiments where no confirmation is required (whether for any transmission based on a swipe determination, or based on the swipe interpretation system 216 further determining that a value in the information to be sent falls below a threshold for the value), the transceiver 202 completes transmission of the information without requiring further input from the user of the mobile communications device 102. In alternative embodiments where confirmation is required (whether by default or because the swipe interpretation system 216 determines that the value falls at or above the threshold, for example), the swipe interpretation system 216 may direct the mobile communications device 102 request a confirmation from the user before completing transmission.

For example, the swipe interpretation system 216 may direct some aspect of the user interface 208 to alert the user to provide confirmation. This may assume the form of a chime output from a speaker, a light flashing from an LED, a vibration, or some combination of these things that may direct the user of the mobile communications device 102 to interact with a confirmation window generated on the touchscreen of the user interface 208. The confirmation window may include a button to confirm and a button to deny that the transmission should be sent to the identified recipient. In an alternative embodiment, the swipe interpretation system 216 may direct the transceiver 202 to transmit a message to a smartwatch that the mobile communications device is paired with (in embodiments where this is the case) to request confirmation at the smartwatch to complete the transmission to the identified recipient. Confirmation may additionally or alternatively come in the form of a detected level of shaking or voice input, to name some examples.

If confirmation is received (whether from a confirmation window on the touchscreen of the user interface 208 or from a smartwatch that transmits the results of a confirmation there to the transceiver 202 for the swipe interpretation system 216 to cause the information to be sent to the identified recipient), then the swipe determination system 216 directs the transceiver to complete transmission of the information.

In embodiments where the mobile communications device 102 is part of a group and another entity in the group has selected to transmit information to the mobile communications device 102, the swipe interpretation system 216 of the receiving mobile communications device 102 may assist with notification and confirmation. For example, the swipe interpretation system 216 may be triggered, upon the transceiver 202 receiving the information, to cause one or more components of the user interface 208 to output a notification. This may include a passive notification when the touchscreen of the user interface 208 is locked. This may further or alternatively include a light notification (e.g., activation of one or more LEDs). The swipe interpretation system 216 may further cause the touchscreen to display a notification when the user next logs in. The notification may request the user of the mobile communications device 102 to accept or reject the information received from the entity. Alternatively, the swipe interpretation system 216 may direct the mobile communications device 102 to automatically accept the information. Upon acceptance or rejection, the swipe interpretation system 216 may then direct the transceiver 202 to transmit a status response to the sending entity with the result.

Figure 3:
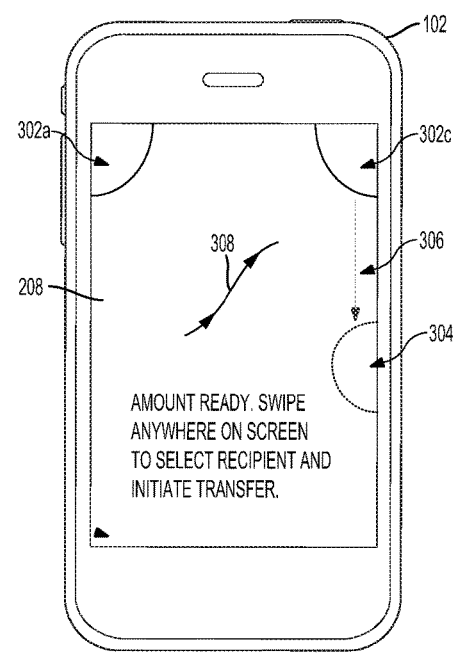
FIG. 3 is a block diagram of an exemplary mobile communications device according to embodiments of the present disclosure.

Turning now to FIG. 3, a block diagram is illustrated of an exemplary mobile communications device 102 according to embodiments of the present disclosure. For simplicity of discussion, reference will be made to mobile communications device 102*b* from FIG. 1 above, where as discussed with respect to the example in FIG. 1 the mobile communications device 102*b* is in communication with two other entities in a group, mobile communications devices 102*a* and 102*c*. This is for simplicity of discussion only. Other numbers of entities may also be included in the group.

The mobile communications device 102*b* may have the components described with respect to FIG. 2 above. FIG. 3 illustrates the touchscreen of the user interface 208, referred to here for simplicity as the touchscreen 208. As can be seen in FIG. 1, the mobile communications device 102*a* is above and to the left of the mobile communications device 102*b*. In FIG. 3, the mobile communications device 102*a* has been associated (e.g., by the swipe interpretation system 216 of the mobile communications device 102*b*) with the section 302*a* in the upper left corner of the touchscreen 208. As further seen in FIG. 1, the mobile communications device 102*c* is above and to the right of the mobile communications device 102*b*. In FIG. 3, the mobile communications device 102*c* has been associated (e.g., by the swipe interpretation system 216) with the section 302*c* in the upper right corner of the touchscreen 208.

In an embodiment, the swipe interpretation system 216 may assign the sections 302*a* and 302*c* as static section assignments on the touchscreen 208. Thus, though any one (or more) of the mobile communications devices 102*a*/102*b*/ 102*c* may move over a time period that embodiments of the present disclosure are active on the touchscreen 208, the assigned sections may remain in the same assigned corners.

In an alternative embodiment, the assigned sections 302*a* and 302*c* may be dynamic. Thus, as any one (or more) of the mobile communications devices 102*a*/102*b*/102*c* move over time, the assigned sections may move as well to reflect a general correspondence between where the devices stand in relation to each other geographically. For example, the mobile communications device 102*b* may determine its own location based on information obtained from the location determination system 212 discussed above with respect to FIG. 2. Similarly, the other devices in the group (mobile communications devices 102*a*/102*c*) may periodically send updated location information to each other (and mobile communications device 102*b* to the others). The swipe determination system 216 may use this information to update where on the touchscreen the associated sections are found.

As illustrated in FIG. 3, the position of the mobile communications device 102*c* may change over time relative to the position of the mobile communications device 102*b*. The swipe determination system 216 determines this based on updated location information for the various devices, and updates the position of the section 302*c* to shift 306 to location 304 on the touchscreen 208. The shift may be visible as a movement from the current location to the new location 304 (e.g., in real time or near-real time), or may be removed from its current location and reproduced at the new location 304.

As illustrated in FIG. 3, each section 302a, 302c is blank. In an embodiment, assigned sections may be fully opaque so that no underlying image/information is visible. In another embodiment, the assigned sections may be partially transparent, so that a user viewing the touchscreen 208 may recognize the extent of the assigned sections 302a, 302c while still be able to discern the information underlying the assigned sections 302a, 302c. In addition or in the alternative, each assigned section 302a, 302c may include one or more identifiers for the mobile communications devices 102a, 102c to which the assigned sections correspond. For example, assigned section 302a may have a name, number, image, or some combination of the above displayed somewhere in the assigned section 302a that identifies the mobile communications device 102a (and/or the user of the mobile communications device 102a) and likewise with respect to assigned section 302c for mobile communications device 102c. The identifier may be generated by the mobile communications device 102, or may be received from the other peer devices in the group.

In an embodiment, one or more mobile communications devices 102 that are within the group that mobile communications device 102b is in may serve as relays to other mobile communications devices 102. This may occur, described here in the context of the example of FIG. 1, where there is another mobile communications device 102 that is within range of mobile communications device 102c but not the mobile communications devices 102a or 102b. This may occur at joining, or over time as a device may leave the range of one or more of the mobile communications devices 102a/102b/102c but still seek to remain in the group to participate (e.g., where the devices are connected via some P2P mechanism such as a D2D connection).

The mobile communications device 102 that is out of range to mobile communications device 102b, but within range of mobile communications device 102c (whether joining while out of range or moving out of range after joining the group), may retain its own assigned section on the touchscreen 208. When a swipe is directed to that out-of-range mobile communications device 102 (to the assigned section), the use of the mobile communications device 102c as a relay to that device may be done transparently to the user of the mobile communications device 102b. Alternatively, when a mobile communications device 102 moves out of range of one or more of the mobile communications device 102b, the assigned section on the touchscreen 208 may merge into the assigned section for the device that functions as relay, in this example mobile communications device 102c. As part of this merging, the assigned section 302c may add additional information about the relay option on reaching the out-of-range device, or may split the section in half, one half for the mobile communications device 102c and the other for the out-of-range device, to name just a few examples.

Looking at a particular example in FIG. 3, a swipe 308 is detected on the touchscreen 208. As illustrated, the lower left portion of the swipe 308 is the beginning of the swipe 308, with the direction of the swipe 308 progressing upward and to the right across the touchscreen 208 over a period of time. The data corresponding to the swipe 308 is received, processed, and conveyed to the swipe interpretation system 216 for example as discussed above with respect to FIG. 2.

The swipe interpretation system 216 determines whether the swipe 308 is directed towards an assigned section of the touchscreen 208, for example by determining whether the swipe 308, had it progressed from the point it ended, would have intercepted any point of any of the sections of the touchscreen 208 (or, where the swipe ends on a point of an assigned section, which section that ending point occurred at). In an embodiment, when the swipe 308 does not end in any assigned section, the swipe interpretation system 216 may determine whether the swipe 308 would have progressed to a threshold region around an assigned section.

In the example of FIG. 3, the swipe interpretation system 216 may determine that the swipe 308 would have intersected the assigned section 302c (had it continued on its present direction) which corresponds to mobile communications device 102c. In the example illustrated in FIG. 3, before the swipe occurred the user set the information that it desired to transmit to another peer device, here an amount of money. Then the swipe interpretation system 216 informed the user via the touchscreen 208 that it was ready to receive a swipe to indicate which mobile communications device to send the money to. With the swipe 308 detected and interpreted, the swipe interpretation system 216 causes the mobile communications device 102b to proceed with transmitting the designated amount (as the particular example of information here).

In an embodiment, the swipe interpretation system 216 may cause the transmission to proceed without further confirmation, thereby providing an easy and convenient way to transmit information in a multi-peer context. In an alternative embodiment, the swipe interpretation system 216 may first require confirmation via either the touchscreen 208 or some paired device associated with the user of the mobile communications device 102b, such as a smartwatch. After the information has been transmitted to the mobile communications device 102c, here the monetary amount, the mobile communications device 102b may receive a confirmation of acceptance (or rejection) of the transmitted information after a period of time. The confirmation may be sent to the mobile communications device 102b, to a paired device, or to both to name some examples.

Figure 4:
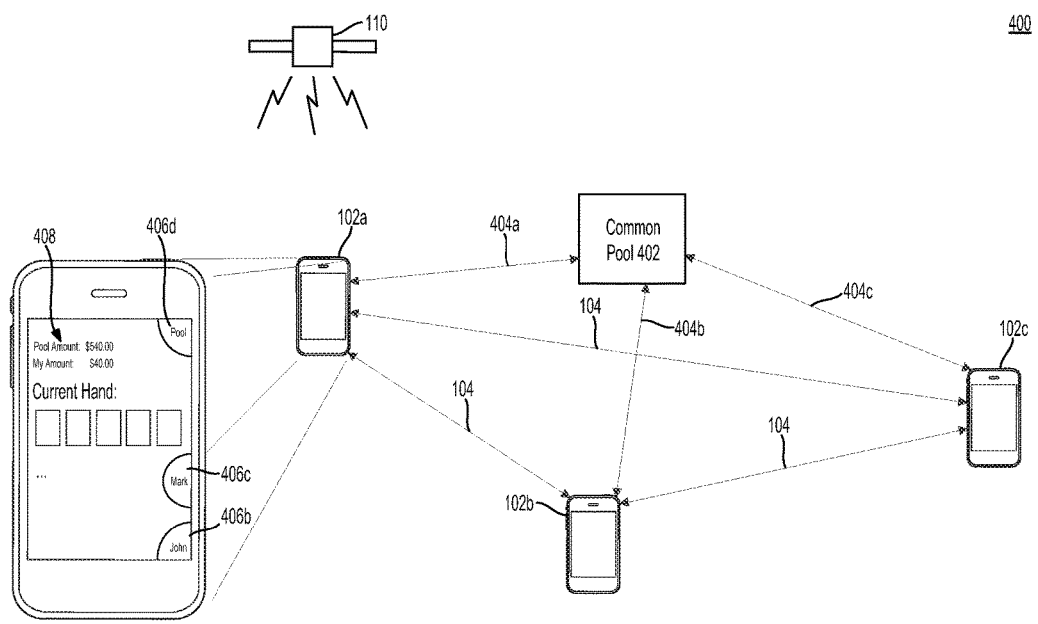
FIG. 4 is a diagram of an exemplary wireless communications environment according to embodiments of the present disclosure.

A few example use scenarios will now be discussed in order to demonstrate a few aspects of embodiments of the present disclosure. For example, FIG. 4 is a diagram of an exemplary wireless communications environment 400 for online gaming according to embodiments of the present disclosure. Similar to the environment 100 of FIG. 1, the environment 400 includes mobile communications devices 102a, 102b, and 102c and GNSS 110. The mobile communications devices 102a, 102b, and 102c are connected to each other via P2P sessions 104 (e.g., D2D links). The wireless communications environment 400 further includes a common pool 402 that the mobile communications devices 102a, 102b, and 102c are connected with via connections 404a, 404b, and 404c, respectively. The connections 404a, 404b, and 404c may be direct links, e.g., D2D links, or alternatively via connections to a network, such as network 108 illustrated in FIG. 1.

In the illustrated embodiment of FIG. 4, an identifier is provided with each assigned section 406b, 406c, and 406d on the touchscreen of the mobile communications device 102a (exemplary of the other mobile communications devices). In an embodiment, the mobile communications device 102a may communicate with the GNSS 110 to at least periodically update location information. The mobile communications device 102a may additionally communicate with the other mobile communications devices 102b/

102c to send and receive updated location information for those devices. Where the common pool 402 is hosted by a server, the location may be provided via GNSS information and/or location based on IP address (just to name a few examples). The assigned sections 406b, 406c, and 406d may dynamically move about the periphery of the touchscreen of the mobile communications device 102a as discussed above with respect to FIG. 3, based on the orientation of the mobile communications device 102a at any given point in time.

The common pool 402 may be maintained at a server that is independent from the mobile communications devices 102a/102b/102c. The common pool 402 may be, for example, a common pool to which each of the mobile communications devices 102a/102b/102c may periodically send information (e.g. monetary value) and receive information. In the example of FIG. 4, the common pool 402 may be a hosted pot for money or some other form of real or virtual currency.

In this example, each of the mobile communications devices 102a/102b/102c may have occasion to desire to transmit information to the common pool 402. For example, the mobile communications devices 102a/102b/102c may be connected to each other for the purposes of an online game, such as a poker game. Therefore, when a bid or ante is to be put into the "pot," the user of a given mobile communications device 102a (as just one example representative of the other devices as well) may swipe on their touchscreen toward the section 406d on their touchscreen associated with the common pool 402. In an embodiment, the user may use different combinations of gestures to signal different amounts to transfer. For example, a single finger swipe detected may be determined to correspond to a first fixed amount (e.g., fixed by default or by the user previously), a two-finger swipe detected may be determined to correspond to a second fixed amount (e.g., greater than the first and fixed by default or the user previously), etc.

In response, the mobile communications device 102a transmits information identifying an amount to be put into the pot via the connection 404a. The touchscreen of the mobile communications device 102a may display pool and personal amounts 408 to update the user of their current status. In an embodiment, the transmission may occur without any confirmation. In another embodiment, the mobile communications device 102a may first seek confirmation from the user of the device that the amount is desired to be sent, which may for example be performed by a touch to a relevant portion of the screen or by shaking the device.

In an embodiment, the server hosting the common pool 402 may maintain a running total of the amount in the pool contributed from one or more of the mobile communications devices 102a/102b/102c, and send updates to each of the mobile communications devices 102a/102b/102c when changes to the pool amount occurs. In an alternative embodiment, the common pool 402 may not be hosted by a server but instead be a virtual representation of a pool, such that when the user of the mobile communications device 102a swipes towards the section 406d to contribute to the common pool 402, the mobile communications device 102a may in actuality send the information directly to the other mobile communications devices 102b/102c as an update for the pool amount 408 maintained at each of those devices.

Although illustrated in FIG. 4 as being located separately from the mobile communications devices 102a/102b/102c, the common pool 402 may alternatively be hosted by one of the mobile communications devices 102a/102b/102c. For example, if the mobile communications device 102b were to host the common pool 402, the other mobile communications devices 102a/102c may detect swipes directed towards the mobile communications device 102b and, due to the specific context for these devices, determine that they are intended toward the common pool 402 hosted by the mobile communications device 102b.

Alternatively, each of the mobile communications devices 102a/102c may assign multiple sections with respect to the mobile communications device 102b, such as a section specifically for the hosted common pool 402 and a separate section specifically for the mobile communications device 102b. These sections may be proximate to each other, reflecting the general relative location of the mobile communications device 102b to the mobile communications devices 102a/102c.

Figure 5:
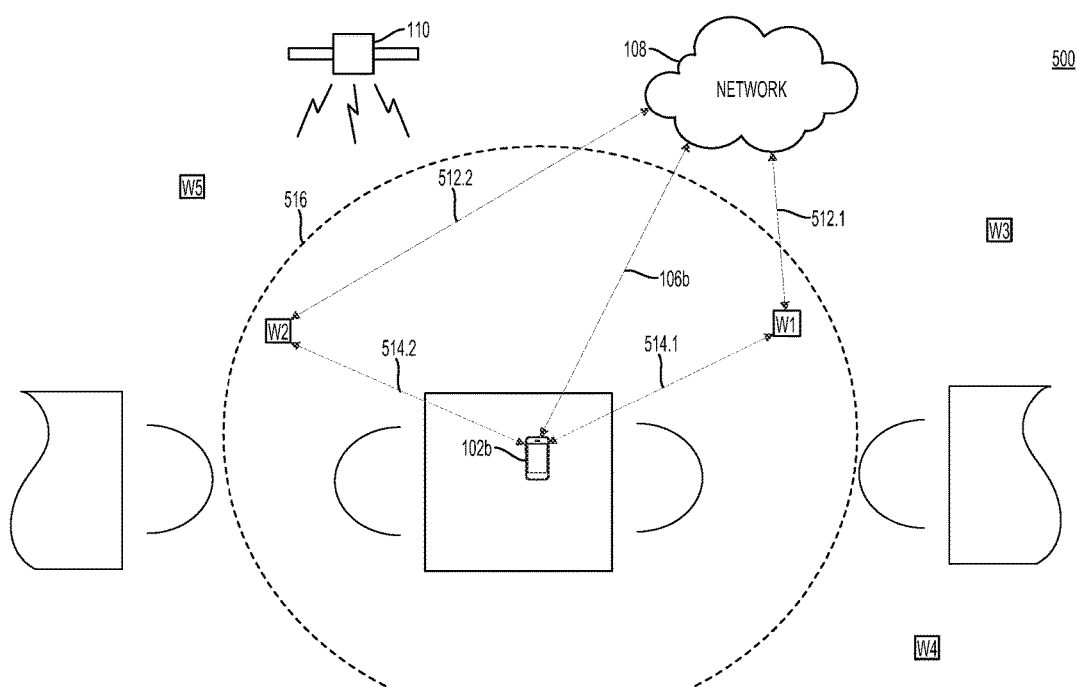
FIG. 5 is a diagram of an exemplary wireless communications environment according to embodiments of the present disclosure.

Another example use scenario is illustrated in FIG. 5, which provides a diagram of an exemplary wireless communications environment 500 in a retail scenario (e.g., in a restaurant) according to embodiments of the present disclosure. The environment 500 may include the mobile communications devices 102, GNSS 110, and network 108, as well as mobile devices W1, W2, W3, W4, and W5.

The mobile devices W1, W2, W3, W4, and W5 are representative of mobile devices associated with different wait staff in the wireless communications environment of FIG. 5. These may be, for example, mobile communications devices such as cellular phones (e.g., whether provided by the establishment or the wait staff's own personal devices). As another example, each of mobile devices W1, W2, W3, W4, and W5 may be an RFID tag. Some combination of the above may also occur. The mobile devices W1, W2, W3, W4, and W5 may be in communication with one or more other devices.

In the illustrated embodiment of FIG. 5, the mobile communications device 102b rests on a table (or held in the hands of a user of the device at the table) in the restaurant. In an embodiment, the mobile communications device 102b may connect with the mobile devices W1 and W2 via direct links 514.1 and 514.2, respectively (e.g., D2D links or Bluetooth links). Alternatively, the mobile communications device 102b may connect with the mobile devices W1 and W2 via a network 108, which may represent a Wi-Fi network at the restaurant as one example. Thus, the mobile communications device 102b may establish connection 106b with the network 108, which in turn has connections 512.1 and 512.2 with the mobile devices W1 and W2, respectively.

In the illustrated embodiment of FIG. 5, a radius 516 may be imposed arbitrarily or due to physical limitations (e.g., communication range limitation of the particular technology used to connect). For example, to reduce the complexity and number of assigned sections appearing on the touchscreen of the mobile communications device 102b, a default radius 516 may be set so that any mobile devices W beyond that radius are not included for display on the touchscreen. The radius 516 may alternatively be set by the user at some previous time or at the time of the visit to the restaurant (and dynamically changed during the visit). Based on the illustrated radius 516 in FIG. 5, the touchscreen on the mobile communications device 102b has sections assigned for the mobile devices W1 and W2, which fall within the radius 516, but not the mobile devices W3, W4, and W5.

When the user of the mobile communications device 102b desires to transmit information to wait staff associated with the mobile devices W1, W2 that are within the radius 516, the user swipes towards the appropriate section on the touchscreen (whether a static section or dynamic section as discussed with respect to FIG. 3 above). In an embodiment, any number of touch points (e.g., from any number of fingers, stylus, etc.) may result in the same determination, such as to transmit the information set previously by the user on the touchscreen of the mobile communications device 102*b*. In an alternative embodiment, the number of touch points (fingers, stylus, etc.) may correspond to different predetermined types of information to be sent.

For example, a single finger swipe may result in transmitting a first tip value, a double finger swipe may result in a second tip value, e.g., greater than the first, etc. As another example, a single finger swipe may result in transmitting information pre-set on the touchscreen (e.g., typed in or selected at a time prior to the swipe), a double finger swipe may result in transmission of a pre-set tip amount, etc. As another example, swipes to two different sections may be made substantially simultaneously, which the mobile communications device 102*b* may interpret by sending the same information to both identified recipients. As another example, the speed of one or more swipes may be used to determine either the specific information to be sent, and/or the intended recipient In some embodiments, the environment 500 may be used to allow the user of the mobile communications device 102*b* to transmit tip amounts to wait staff as desired. In other embodiments, the information sent by a swipe may include an order or a change to an existing order. For example, where the swipe results in transmitting a change to an order, the mobile communications device 102*b* may receive a confirmation of the original order, e.g. as taken by wait staff, and be allowed to change the order while it is being prepared by transmitting a change to wait staff within the radius 516. As another example, the swipe to a wait staff (here, W1 or W2) may result in transmitting information previously set on the screen (e.g., whether typed by the user or selected by the user), such as to indicate a request for assistance or to provide other feedback.

In an embodiment, a central server managed by the restaurant may track the information sent to the wait staff over time, for example to examine different performance metrics of the wait staff, business analytics to determine how people are using the system, what information is most useful in the system, what information is least useful, etc. Where the mobile communications device 102*b* communicates with the mobile devices W via the network 108, the information may be split between the mobile devices W and the central server. Alternatively, the mobile devices W may forward this information on to the central server (whether there are D2D links to the mobile communications device 102*b* or connections via the network 108).

As another example within the environment 500 of FIG. 5, embodiments of the present disclosure may be utilized to assist multiple parties to split a bill amongst themselves. For example, where multiple mobile communications devices 102 are joined in the same group, for example corresponding to users at the same table or tables at a restaurant, the group may use these features to assist in splitting a bill. The bill may be received in paper form, with the value entered in manually to one or more of the mobile communications devices 102 in the group, or may be emailed by the restaurant. Each user of each mobile communications device 102 may swipe to an assigned section of their respective touchscreen, for example a common pool like that discussed in FIG. 4, to transfer a specified portion of the bill from their account to either a hosting mobile communications device 102 in the group to pay the entire bill, or to pay the entire bill in aggregate from each of the devices in the group. Where the individual contributes do not amount to the total bill, this information may be spread through the group to request an additional contribution, for example displayed together with the total contributions so far from each member of the group (for example overlaid on their respective assigned sections on the touchscreen), and also for example with a proposed percentage split for each device in the group calculated to complete the bill.

Figure 6:
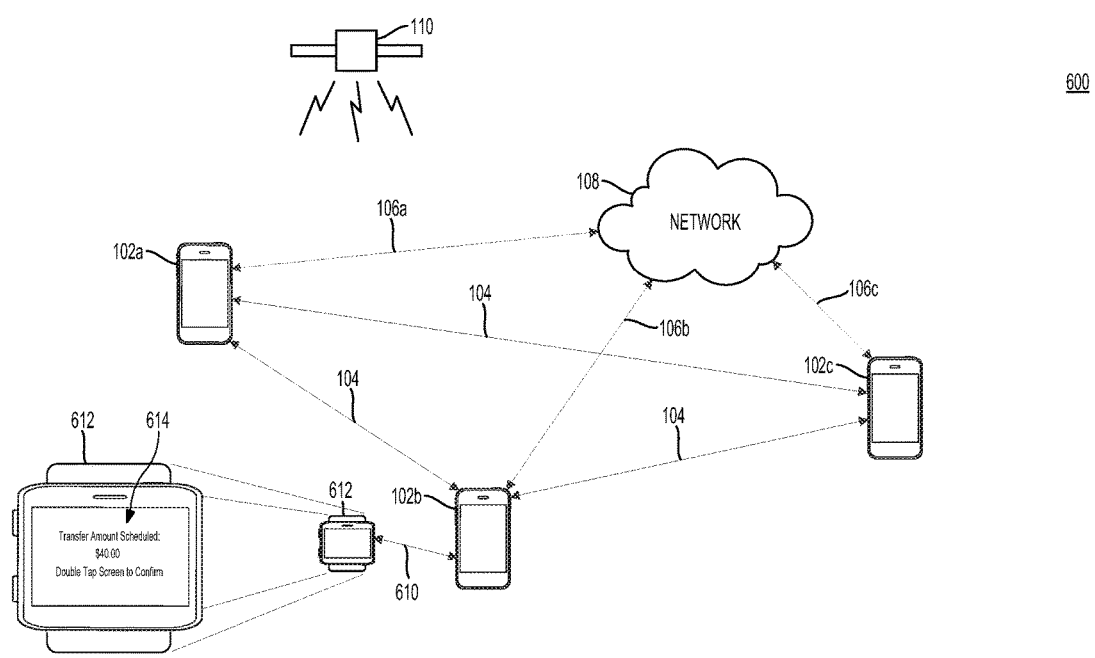
FIG. 6 is a diagram of an exemplary wireless communications environment according to embodiments of the present disclosure.

Another example use scenario is illustrated in FIG. 6, which provides a diagram of an exemplary wireless communications environment 600 in a paired device scenario according to embodiments of the present disclosure. The environment 600 may include the mobile communications devices 102*a*/102*b*/102*c*, GNSS 110, network 108, and paired device 612. The paired device 612 is illustrated in FIG. 6 as being a smartwatch; this is exemplary only. The paired device could be any number of devices that are capable of pairing with the mobile communications device 102*b* (as an example), such as via Bluetooth, D2D, NFC, etc. The elements in FIG. 6 that are similarly numbered to those in FIG. 1 will not be discussed in detail here, relying instead on the discussion above with respect to FIG. 1.

In the example environment 600 of FIG. 6, when the mobile communications device 102*b* is ready to transmit information (e.g., a swipe toward an assigned section of the touchscreen has been detected and processed), the mobile communications device 102*b* (for example, under the direction of the swipe interpretation system 216 described in FIG. 2) transmits a confirmation request to the paired device 612. In an embodiment, the confirmation request includes display information 614 for the paired device 612 to display in furtherance of the confirmation. Alternatively, the paired device 612 may already have various confirmation alternatives stored locally, which the confirmation request triggers the paired device 612 to access (or directs which to select).

Upon receiving the confirmation request, the paired device 612 displays the display information 614. In an embodiment, the paired device 612 may be a device owned and/or operated by the same user associated with the mobile communications device 614. This may provide an added layer of security, for example where sensitive information or monetary amounts are sought to be transferred by a swipe according to embodiments of the present disclosure. In another embodiment, the paired device 612 may be associated with a different user than the user of the mobile communications device 102*b* that seeks to transmit the information. For example, the paired device 612 may be operated by a parent of a child who operates the mobile communications device 102*b*, thereby allowing parental supervision of transfers of such things as monetary value, etc.

After presenting the display information 614 to the user of the paired device 612, the paired device 612 may wait for an input in response. In an embodiment, the paired device 612 may wait a predetermined amount of time, after which if no input has been received the display information 614 may be updated (e.g., with an additional notification alert such as a sound or vibration in the paired device 612) or the confirmation timed out. If the confirmation request times out due to a lack of user input, the paired device 612 may transmit a notification of this back to the mobile communications device 102*b*. In response, the mobile communications device 102*b* may have the option to send another confirmation request to the paired device 612, seek confirmation via the mobile communications device 102*b*'s own touchscreen, or proceed with transmitting the information without confirmation (or have an option pre-selected as the default action to take in this situation).

Where the user does provide the appropriate input response to the display information 614, the paired device 612 may transmit the confirmation back to the mobile communications device 102b. The confirmation request may have specified a particular type of input response that will be recognized as confirmation (e.g. a specific number of distinct taps). Alternatively, the paired device 612 may be left to its own determination of what type of input qualifies as an appropriate input response to the display information 614. Some examples of input includes one or more taps on the screen of the paired device 612, a generic swipe on the screen, a swipe to a specified section of the screen, voice input (e.g., voice recognition of "yes" or "no"), etc.

Once the user of the paired device 612 confirms that the transmission should occur (e.g., either by simply approving or approving where there is also an option to deny), the confirmation is transmitted back to the mobile communications device 102b, which proceeds with transmitting the information.

Figure 7:
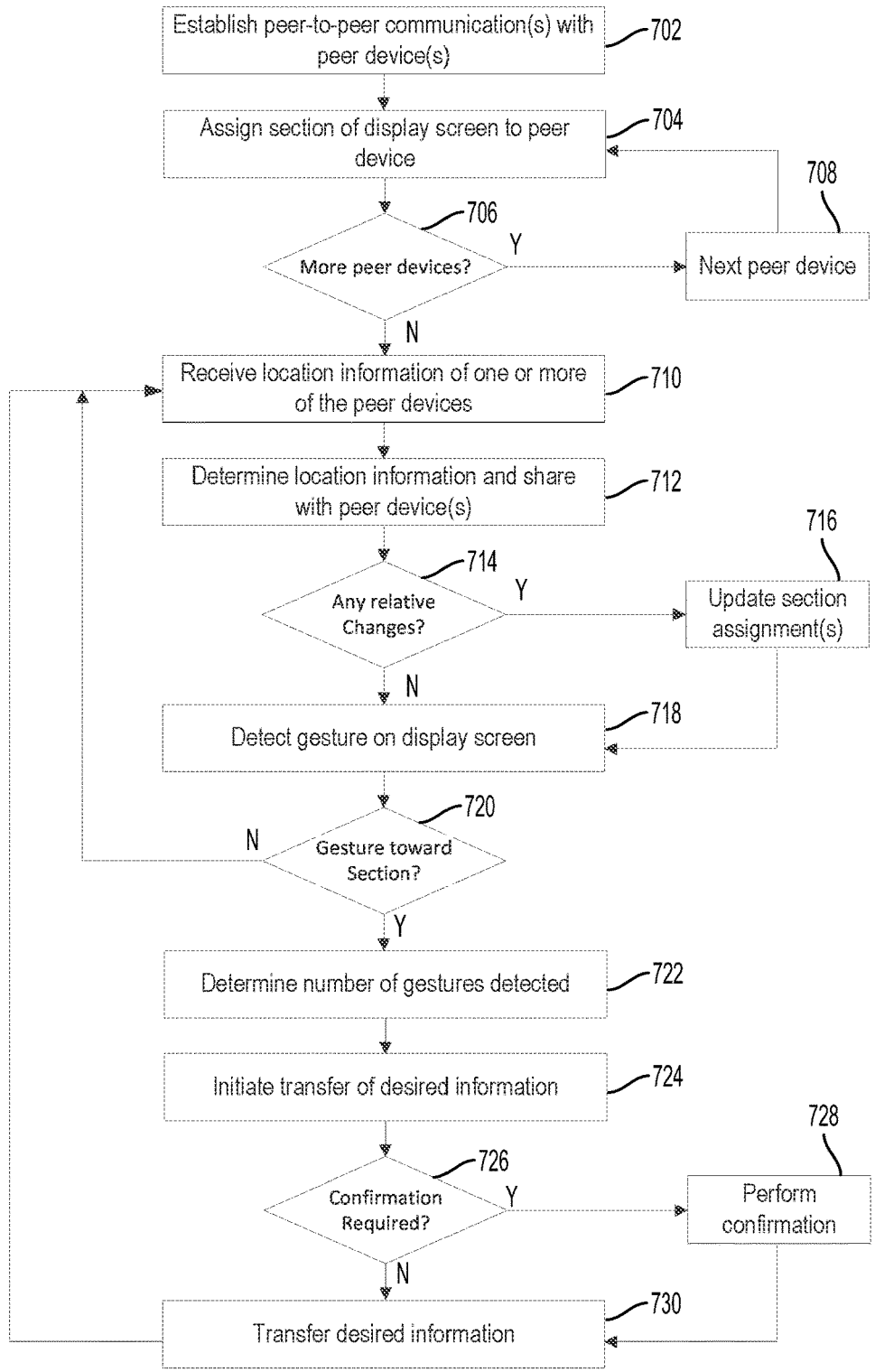
FIG. 7 is a flow diagram illustrating an embodiment of a method for enhanced peer-to-peer networking exchanges according to an embodiment of the present disclosure.

Turning now to FIG. 7, a flow diagram illustrates a method 700 for enhanced peer-to-peer networking exchanges according to an embodiment of the present disclosure. The method 700 will be described with respect to a mobile communications device 102 for simplicity of discussion, though it will be recognized that the aspects described herein may be applicable to a plurality of mobile communications devices 102. It is understood that additional steps can be provided before, during, and after the steps of method 700, and that some of the steps described can be replaced or eliminated for other embodiments of the method 700.

At block 702, the mobile communications device 102 establishes P2P communications with one or more other mobile communications devices 102 (referred to here as peer devices), for example according to one or more of the ways described above with respect to FIG. 1. For example, the mobile communications device 102 may establish all of the different P2P communications using the same technology and protocol, or may establish different communications with different technologies/protocols.

At block 704, the mobile communications device 102 assigns a section of the touchscreen to a peer device. In an embodiment, the assignment may be according to a default order, for example the upper left corner is assigned first, then the upper right, then the lower right, then the lower left depending upon the number peer devices. In another embodiment, the assignment may be according to a relative location of the mobile communications device 102 to the connected peer device, such as made possible by information from the GNSS 110.

At decision block 706, the mobile communications device 102 determines whether there are additional peer devices to which the mobile communications device 102 is in communication that need a section of the touchscreen assigned. If so, then the method 700 turns to the next peer device at block 708 and returns to block 704 to continue as discussed above.

If there are no more peer devices that have not yet been assigned a section of the touchscreen, then the method 700 proceeds to block 710.

At block 710, the mobile communications device 102 receives location information of one or more of the peer devices. For example, the peer devices may broadcast their location information periodically to one or more of the other peer devices that they are connected to.

At block 712, the mobile communications device 102 determines its own location information, for example via communication with GNSS 110 of FIG. 1 or by some other means, such as triangulation to nearby base stations, etc. The actions at blocks 710 and 712 may be interchangeable or occur substantially simultaneously.

At decision block 714, the mobile communications device 102 determines whether there have been any relative changes between the mobile communications device 102 and any of the paired devices. In making this determination, the mobile communications device 102 uses the location information received at block 710 and determined at block 712. For example, the mobile communications device 102 may compare the location information of the mobile communications device 102 against a previous location recorded for the mobile communications device 102 to identify any change, and/or location information of the peer devices against previously stored location information for those devices, and/or location information of the mobile communications device 102 against the location information of the peer devices.

In an embodiment, the mobile communications device 102, when determining relative change, may further determine whether any detected relative change between devices exceeds a defined threshold, so that the assigned sections remain relatively stationary until sufficiently large changes warrant an update on the location of the sections. For example, a movement of a few degrees in relative change may not rise above the defined threshold, so that small movements do not cause unnecessary activity on the screen.

If it is determined at decision block 714 that a relative change has occurred, then the method 700 proceeds to block 716. At block 716, the mobile communications device 102 updates the section assignment(s) of the peer device(s) whose locations have changed relative to the mobile communications device 102.

If it is instead determined at decision block 714 that no relative change has occurred, or in embodiments where there is the determined threshold, that the relative change does not exceed the determined threshold, then the method 700 proceeds to block 718.

In embodiments where the sections of the touchscreen are statically assigned (e.g., relative movement does not influence the locations of the sections on the touchscreen), the actions at blocks 710 to 716 may be skipped.

At block 718, a gesture on the touchscreen of the mobile communications device 102 is detected. For example, the mobile communications device 102 may detect a swipe type of gesture on the touchscreen (e.g., of one or more fingers). Although illustrated in FIG. 7 as directly following the relative change detection, the detection at block 718 may occur prior to or concurrent with the relevant change detection occurring at blocks 710-716.

At decision block 720, the mobile communications device 102 determines whether the detected gesture from block 718 was directed towards an assigned section of the touchscreen, for example as described above with respect to FIG. 3. If not, then the method returns to block 710.

If the mobile communications device 102 instead determines that the detected gesture was directed toward an assigned section, and which specific device the gesture was directed towards, the method 700 proceeds to block 722.

At block 722, the mobile communications device 102 determines the number of gestures detected from block 718. For example, multiple gestures towards the same (or different) sections may indicate different types, or amounts, of information that is desired to be transmitted to the associated recipient peer device(s). This may be an optional block in the method 700, for example where multi-gesture detection is not supported or desired.

At block 724, the mobile communications device 102 initiates a transfer of the desired information to the identified recipient(s) from blocks 720 and 722 (where applicable).

At decision block 726, if a confirmation is required by a user, such as the user of the mobile communications device 102, then the method 700 proceeds to block 728.

At block 728, the mobile communications device 102 requests confirmation. For example, this may include displaying a confirmation request on the touchscreen of the mobile communications device 102. As another example, this may include transmitting a confirmation request to a paired device, such as described above with respect to the example in FIG. 6, and waiting for a response.

If a confirmation is received, then the method 700 proceeds from block 728 to block 730. If confirmation is not received, or declined, then the method 700 may return to block 724 to attempt initiation again or may abandon the transmission attempt.

Returning to decision block 726, if confirmation is not required then the method 700 may proceed directly to block 730.

At block 730, the mobile communications device 102 transmits the desired information to the identified recipient(s) from among the peer devices in the common group. Some examples of desired information may include an amount of money, an amount of virtual currency, wagers, tips, orders, images, videos, text messages, etc.

Figure 8:
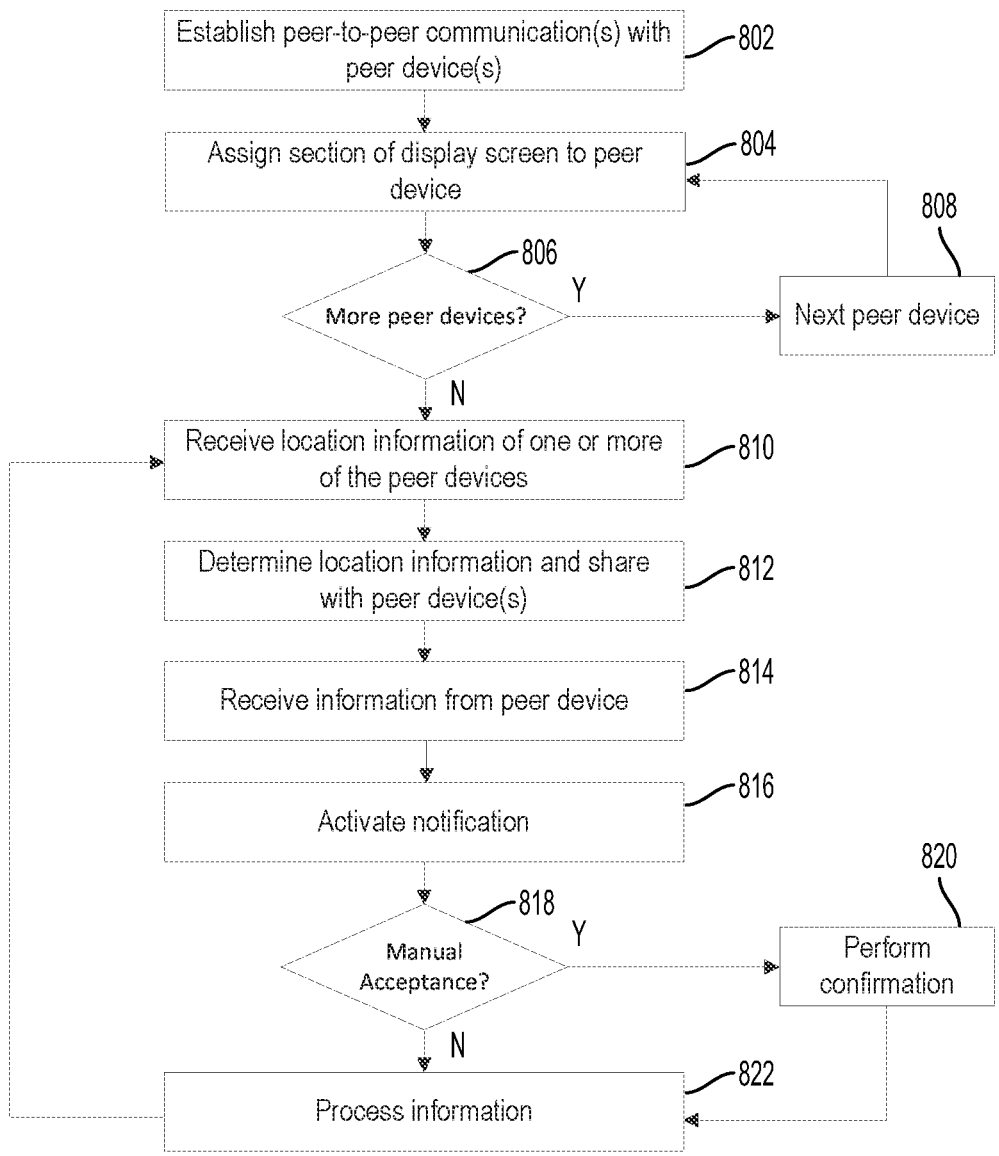
FIG. 8 is a flow diagram illustrating an embodiment of a method for enhanced peer-to-peer networking exchanges according to an embodiment of the present disclosure.

Turning now to FIG. 8, a flow diagram illustrates an embodiment of a method 800 for enhanced peer-to-peer networking exchanges according to an embodiment of the present disclosure. The method 800 will be described with respect to a mobile communications device 102 for simplicity of discussion, though it will be recognized that the aspects described herein may be applicable to a plurality of mobile communications devices 102. It is understood that additional steps can be provided before, during, and after the steps of method 800, and that some of the steps described can be replaced or eliminated for other embodiments of the method 800.

At block 802, the mobile communications device 102 establishes P2P communications with one or more other peer devices such as discussed above with respect to block 702.

At blocks 804-808, the mobile communications device 102 assigns a section of the touchscreen to all associated peer device, for example as discussed above with respect to blocks 704-708.

At block 810, the mobile communications device 102 receives location information of one or more of the peer devices, for example as discussed above with respect to block 710.

At block 812, the mobile communications device 102 determines its own location information, for example as discussed above with respect to block 712.

At block 814, the mobile communications device 102 receives a transfer of desired information from at least one of the peer devices (for example, as transmitted according to blocks 724-730 in FIG. 7).

At block 816, in response to receipt of the information at block 814, the mobile communications device 102 activates a notification on the device's display. This may be, for example, a passive notification when the touchscreen is locked. This may further or alternatively include a light notification (activation of one or more LEDs) or an auditory notification (a chime, etc.). This may also include causing the touchscreen to display a notification when the user next logs in. The notification may request the user of the mobile communications device 102 to accept or reject the information received from the peer device.

At decision block 818, it is determined whether manual acceptance (e.g., confirmation) of the received information is required or not. If manual acceptance/confirmation is required, then the method 800 proceeds to block 820 and performs the confirmation. This may include the user selecting a button identifying acceptance on the touchscreen, or shaking the mobile communications device 102, etc. Once confirmation is received, the method 800 proceeds to block 822. If confirmation is not received, or declined, then the mobile communications device 102 may transmit this result to the peer device that initiated the transmission.

If, at decision block 818, it is determined that manual acceptance is not required, then the method 800 proceeds to block 822. At block 822, the mobile communications device 102 processes the received information. This may include updating a local account with a value, or opening an image, or text, etc. as the case may be.

Figure 9:
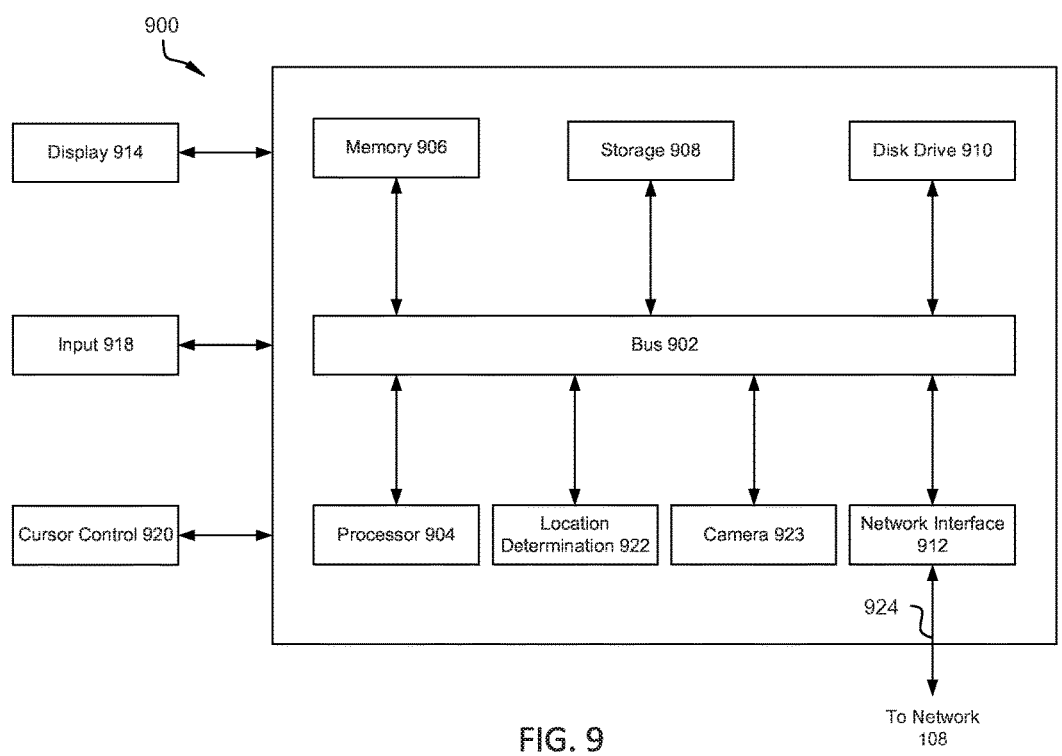
FIG. 9 is a schematic view illustrating an embodiment of a computing system.

Referring now to FIG. 9 an embodiment of a computer system 900 suitable for implementing, for example, the mobile communications devices, mobile devices, servers, etc., is illustrated. It should be appreciated that other devices utilized by users, payment service providers, point of sale operators, and/or merchants/stores in the system discussed above may be implemented as the computer system 900 in a manner as follows.

In accordance with various embodiments of the present disclosure, computer system 900, such as a mobile device, computer and/or a server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), a location determination component 922 (e.g., a Global Positioning System (GPS) device as illustrated, a cell tower triangulation device, and/or a variety of other location determination devices known in the art), and/or a camera component 923. In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the mobile communications devices, mobile devices, and/or servers. Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 108 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory storing instructions;
a display configured to display information to a user of the system; and
one or more hardware processors coupled to the non-transitory memory and configured to read the instructions from the non-transitory memory to cause the system to perform operations comprising:
establishing a peer-to-peer connection with a first peer device and a second peer device;
assigning, after establishing the peer-to-peer connection, a first section of the display for transmitting information to the first peer device and a second section of the display for transmitting information to the second peer device;
displaying a first visual representation of the first peer device at the first section of the display and a second visual representation of the second peer device at the second section of the display;
determining whether a touch gesture detected on the display is directed towards the first visual representation at the first section or the second visual representation at the second section; and
transmitting, in response to determining that the detected touch gesture is directed towards the first section or the second section, information associated with the touch gesture to the determined device from among the first peer device or the second peer device.

2. The system of claim 1, wherein the information associated with the touch gesture, upon receipt at the determined device, activates a notification on a display of the determined device prompting a user of the determined device to accept or decline the information associated with the touch gesture when the display of the determined device is accessed.

3. The system of claim 1, further comprising:
a location determination device configured to determine a location of the system.

4. The system of claim 3, wherein the assigning comprises:
obtaining the location of the system from the location determination device;
receiving, from the first and second peer devices, respective locations of the first and second peer devices;
selecting, as the first section of the display, a first edge of the display corresponding to a direction of the first peer device relative to the system based on their respective locations, wherein the first section changes position on the display in response to a movement of the first peer device relative to the system; and
selecting, as the second section of the display, a second edge of the display corresponding to a direction of the second peer device relative to the system based on their respective locations, wherein the second section changes position on the display in response to a movement of the second peer device relative to the system and the first and second sections do not overlap each other on the display.

5. The system of claim 1, wherein:
the first and second peer devices are associated with respective wait staff at a restaurant, and a touch gesture directed towards one of the first and second sections identifies a tip to be transmitted as the information to the determined device.

6. The system of claim 5, wherein:
the touch gesture comprises a plurality of touch points, and
the operations further comprise:
determining a number of the plurality of touch points;
identifying a tip amount corresponding to the number; and
transmitting, as the information associated with the touch gesture, the identified tip amount to the determined device.

7. The system of claim 1, wherein the information associated with the touch gesture comprises at least one of:
a currency amount;
a virtual currency amount;
a product identifier;
a wager;
an image; or
a message.

8. A method, comprising:
establishing, by a transceiver of a first peer device, a peer-to-peer connection with a second peer device and a third peer device;
assigning, by the first peer device after establishing the peer-to-peer connection, a first section of a display of the first peer device for transmitting information to the second peer device and a second section of the display for transmitting information to the third peer device;
displaying a first visual representation of the first peer device at the first section of the display and a second visual representation of the second peer device at the second section of the display;
determining whether a touch gesture detected on the display is directed towards the first visual representation at the first section or the second visual representation at the second section; and
transmitting, in response to determining that the detected touch gesture is directed towards a determined device assigned to the first section or the second section, information associated with the touch gesture to the determined device from among the second peer device or the third peer device.

9. The method of claim 8, wherein the information associated with the touch gesture, upon receipt at the determined device, activates a notification on a display of the determined device prompting a user of the determined device to accept or decline the received information when the display of the determined device is accessed.

10. The method of claim 8, wherein the establishing further comprises:
establishing device-to-device connections between the first peer device, the second peer device, and the third peer device.

11. The method of claim 8, wherein the establishing further comprises:
connecting, by the first peer device, to the second and third peer devices via a WiFi connection; and
entering, by the first peer device, a security credential associated with a common group that each of the second and third peer devices also access so that the first, second, and third peer devices enter the peer-to-peer connections via the common group.

12. The method of claim 8, wherein:
the first peer device is further paired with a smartwatch associated with a same user as the first peer device, and the determining that the touch gesture is directed towards the first or second sections of the display triggers the first peer device to send a notification to the smartwatch which, when received at the smartwatch, activates a confirmation application at the smartwatch to cause the smartwatch to display, before completing transmission of the information associated with the touch gesture, a request for confirmation and to enable the first peer device to complete the transmission in response to the smartwatch receiving a confirmation touch to the request for confirmation.

13. The method of claim 8, wherein the first peer device comprises a location determination device, the method further comprising:
obtaining a location of the first peer device from the location determination device; and
receiving, from the second and third peer devices, respective locations of the first and second peer devices.

14. The method of claim 13, further comprising:
selecting, as the first section of the display, a first edge of the display corresponding to a direction of the second peer device relative to the first peer device, wherein the first section changes position on the display in response to movement of the second peer device relative to the first peer device based on the locations of the first and second peer devices; and
selecting, as the second section of the display, a second edge of the display corresponding to a direction of the third peer device relative to the first peer device, wherein the second section changes position on the display in response to movement of the third peer device relative to the first peer device based on the locations of the first and third peer devices, and the first and second sections do not overlap each other on the display.

15. The system of claim 1, further comprising:
a transceiver configured to transmit the information.

16. The system of claim 15, wherein the transceiver comprises a WiFi transceiver, the operations further comprising:
connecting to the first peer device and the second peer device via a WiFi connection; and
receiving a security credential associated with a common group that each of the first and second peer devices also access so that the system and the first and second peer devices enter the peer-to-peer connections via the common group.

17. The system of claim 1, wherein the operations further comprise:
pairing with a smartwatch associated with a same user as the system; and
triggering, in response to the determining, the system to send a notification to the smartwatch which, when received at the smartwatch, activates a confirmation application at the smartwatch to cause the smartwatch to display, before completing transmission of the information associated with the touch gesture, a request for confirmation.

18. The system of claim 17, wherein the operations further comprise:
completing the transmission in response to receiving a confirmation from the smartwatch, based on the smartwatch receiving a confirmation touch to the request for confirmation.

19. The system of claim 1, wherein the operations to establish the peer-to-peer connections further comprise:

establishing device-to-device connections between the system, the first peer device, and the second peer device.

20. The system of claim 1, wherein the operations to establish the peer-to-peer connections further comprises:
sending a request to form an ad-hoc group with the first peer device and the second peer device to a service provider; and
receiving, from the service provider, a code to enter the requested ad-hoc group.

* * * * *